(12) United States Patent
Anderson et al.

(10) Patent No.: US 8,855,444 B2
(45) Date of Patent: *Oct. 7, 2014

(54) METHOD FOR PARTITIONING AND PROCESSING A DIGITAL IMAGE

(71) Applicant: Emmanuel Hislen, Alameda, CA (US)

(72) Inventors: Brian J. Anderson, San Jose, CA (US); Emmanuel Hislen, Alameda, CA (US)

(73) Assignee: Marseille Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/726,089

(22) Filed: Dec. 22, 2012

(65) Prior Publication Data

US 2013/0293549 A1 Nov. 7, 2013

Related U.S. Application Data

(63) Continuation of application No. 12/655,769, filed on Jan. 6, 2010, now Pat. No. 8,374,463.

(51) Int. Cl.
*G06K 9/32* (2006.01)
*G06T 3/40* (2006.01)
*G06T 3/00* (2006.01)

(52) U.S. Cl.
CPC ............... *G06T 3/4076* (2013.01); *G06T 3/00* (2013.01)
USPC ......................................... 382/298

(58) Field of Classification Search
USPC .......................... 382/173, 293, 294, 298, 302
See application file for complete search history.

(56) References Cited

U.S. PATENT DOCUMENTS

| 8,125,571 B2* | 2/2012 | Guermoud et al. ........... 348/719 |
| 8,374,463 B1* | 2/2013 | Anderson et al. ............. 382/298 |
| 2002/0141499 A1* | 10/2002 | Goertzen ................ 375/240.12 |
| 2009/0262190 A1* | 10/2009 | Dotchevski et al. .......... 348/143 |

* cited by examiner

*Primary Examiner* — Phuoc Tran

(57) ABSTRACT

Method for partitioning a digital image into two or more regions where each region is defined using a portion of the digital image. In addition, margin pixels for each region are defined as pixels that correspond to a top margin, a bottom margin, a left margin, and a right margin of each region of the digital image. Margin pixels are generated by using various techniques such as on-the-fly generation, using data information of neighboring pixels to each region, using data information of pixels within each region, or using predetermined data information for a color including black. The pixels of each region are processed with its margin pixels to create a new processed region of the digital image. The processing may include scaling of each region from a first resolution to a second resolution. The data information of each processed region can be displayed using a portion of an electronic display panel, or a monitor having with multiple display regions. The concatenations of the displayed representations using data information from each processed region faithfully reproduce the digital image.

20 Claims, 11 Drawing Sheets

METHOD FOR PARTITIONING AND PROCESSING A DIGITAL IMAGE

CROSS REFERENCE TO RELATED APPLICATION

This application is a continuation of U.S. patent application Ser. No. 12/655,769 filed Jan. 6, 2010, entitled "Method FOR PARTITIONING A DIGITAL IMAGE USING TWO OR MORE DEFINED REGIONS" and is incorporated by reference herein in its entirety.

TECHNICAL FIELD

The subject of this application generally relates to the field of digital image processing and more particularly to digital image scaling of an original image size to a target image size that is produced using two or more defined regions of an output display.

BACKGROUND

Traditional cameras are used to take photographs by capturing light onto photographic films. Digital cameras use electronic devices such as Charge Coupled Devices (CCD) to capture light, of an original image, and produce a digital representation of an image. The digital representation can be further manipulated using different compression or transmission techniques or standards such as Moving Picture Experts Group (MPEG). Furthermore, the digital representation of the image can be stored in various digital formats in accordance with the intended memory storage mediums e.g. Hard disk, DVD, CD-Rom, etc . . . such that the reproduction of the original image may be achieved using a variety of means or mediums using the stored digital representation of the original image. For examples, electronic display devices can display the image on their screen.

The digital representation of the image can greatly vary in quality depending on the sampling of the original image. Each sample of the original image represents a small portion of the overall image. Therefore, more samples are required in order to have a better or more accurate representation of the original image. A pixel represents one sample of the original image. Normally, an image is sampled using a two-dimensional grid having a width, X, and a height, Y, that are specified in unit of pixel, where the digital image resolution corresponds to X time Y, and each pixel corresponds to the smallest single component of the original image. For example, a first camera with a resolution of 640×480 would have 640 pixels in the horizontal direction and 480 pixels in the vertical direction. The digital image resolution, total number of pixels, is 307,200 pixels. Higher resolution requires more pixels to be generated when capturing an image, and the closer the digital image produced is to the original image. Hence, a second digital camera with a resolution of 1280×960 would have a total number of pixels of 1,228,800 pixels or four times the resolution of the first camera.

Each pixel of a digital image corresponds to data information that is expressed as a number of bits that is used to describe each pixel (or sample) of the original image. This data information is normally expressed as number of bits per pixel (bpp). A broader range of distinct colors can be represented with a higher number of bits per pixel. Nowadays, There are many different formats that are in use to capture and/or display color information, e.g. the RGB. For example, a 24-bit color model uses 8 bits to represent red, 8 bits to represent blue and 8 bits to represent green. Under this model, each of these three colors possesses a $2^8$ or 256 levels. Therefore, they can be combined (256×256×256) to give a possible 16,777,216 colors.

A video camera captures a scene for a specific duration of time, and produces many sequential digital images. Normally, each digital image is referred to as a frame, having a frame size defined as number of horizontal pixels x number of vertical pixels. A frame rate is also specified that represents the number of frames being captured per second. In addition, a scanning system is identified as progressive or interlaced to indicate how the video frames are generated and thus how they should be processed and displayed so that the original scene is faithfully reproduced when these digital images are played back in sequence, e.g. using an electronic display panel or a digital television set.

In order to reproduce the original scene timing, each digital image, or frame within the scene, must be reproduced and displayed in a given amount of time. Hence, the time required to process and display one pixel is limited and finite. Electronic display devices resolution is specified, in a similar way as explained above for a digital camera, as having X by Y pixels. Again, the higher the resolution of the electronic display device is, the better the image that is being reproduced. As the electronic display panel technology advances to an ever-higher resolution, a bigger challenge to the device electronics is to be able to process data information for each pixel within an ever-smaller amount of time.

The processing demands on electronic circuits for High-Definition television (HD TV), e.g. 1,920 pixels wide and 1,080 pixels high, is much greater than a Standard-Definition television (SD TV), e.g. 720 pixels wide and 480 pixels high. The next generation of digital TVs and projectors, recently developed, will be able to display four times the high definition resolution of current HD TV sets. This Quad-HD set is capable of displaying 3,840 pixels wide and 2,160 pixels high. This presents a big challenge to the processing circuitry, where each pixel must be processed and faithfully reproduced regardless of the input image resolution having a Quad-HD content from standardized interfaces such as HDMI 1.4 or DisplayPort 1.2a and/or other lower resolution such as 1,920× 1,080 or lower.

The need arises to provide an electronic system capable of faithfully processing digital images with various resolutions and display them using a Quad-HD resolution display or higher resolution type of electronic display panels. Marseille Networks' 4×HD™ video technology delivers the ability to process digital images to be displayed in 3840×2160 resolution, while selectively removing artifacts and preserving stunning image details. Furthermore, Marseille Networks is the first to introduce Quad-HD solution to home theater systems. Marseille Networks' 4×HD™ video technology provide an efficient system with ample flexibility and processing power for blending and or scaling various types of video image streams, including High-Definition streams, to be displayed over Quad-HD display panel.

DETAILED DESCRIPTION

Figure 1:
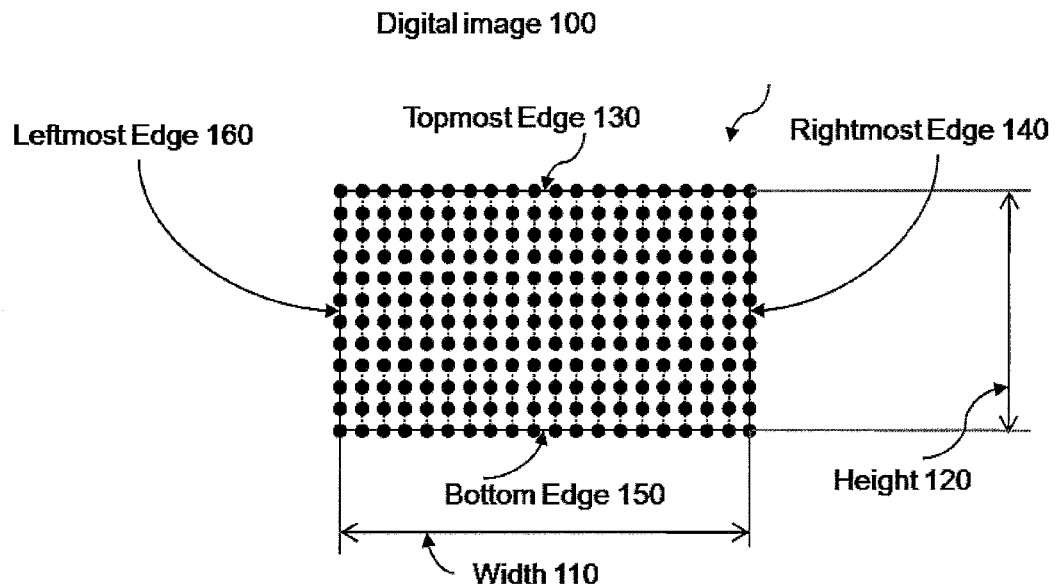
FIG. 1 shows an exemplary model of a digital image using pixels arranged as a two-dimensional grid format.

The present disclosure provides, amongst other things, techniques to minimize or substantially eliminate artifacts when scaling low resolution video or digital images to higher resolution digital images in order to be displayed using electronic display panels with two or more defined regions. In one respect, a digital video comprises many sequential digital images that capture a certain scene for a certain period of time. A digital image is split into multiple regions and each region is then selectively processed and/or scaled so that it can be displayed using a correspondent region of the display. Each of the multiple regions is defined using a portion of the digital image and is specified using a width and a height, in unit of pixel. In addition, neighboring pixels for each of the multiple regions are defined as margins, e.g. Top margin, Right margin, Bottom margin, and Left margin that will be described in details in this disclosure, and are specified to comprise pixels that are part of the digital image and/or newly generated pixels using various techniques such as on the fly or a predetermined data information. The combination of each of the multiple regions and all of its margins are then processed or scaled to produce a processed portion of the digital image. Furthermore, the concatenation of all of the processed portions of the digital image are then displayed, using electronic display panels with multiple defined regions, and thus faithfully reproduce the original digital image.

The disclosure and the various features and advantageous details are explained more fully with reference to the nonlimiting embodiments that are illustrated in the accompanying drawings and detailed in the following description. Descriptions of well-known processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those of ordinary skill in the art from this disclosure. Other features and associated advantages will become apparent with reference to the following detailed description of specific embodiments in connection with the accompanying drawings.

The term "coupled" is defined as connected, although not necessarily directly, and not necessarily mechanically. The terms "a" and "an" are defined as one or more unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

In general, various processing techniques can be used to process or scale digital images from one specified resolution to another specified resolution. For example, newly available Quad-HD electronic display panels, or can be simply referred to as monitors, can display images using a resolution of 3840×2160 pixels, or 3840 pixels in width and 2160 pixels in height, for a total of 8,294,400 pixels. A high definition digital image may be specified using 1920 pixels in width and 1080 pixels in height, or in other words a resolution of 1,920×1,080 for a total of 2,073,600 pixels. As you can see The Quad-HD monitor is capable of displaying four times the number of pixels that define the digital image using four regions each of which is capable of displaying a full 1,920×1,080 pixels. Normally a low resolution digital image is first scaled to 3840×2160 resolution and then split into four regions, each of which is then displayed using a corresponding region of the monitor. The higher the resolution of an available Quad-monitor is, the higher the processing requirement is to display a given digital image at the full monitor resolution. This disclosure describes a suitable solution to solve the ever-increasing challenge of scaling a given digital image in order to be faithfully reproduced and fully displayed using monitors with multiple defined regions, e.g. Quad-HD monitor.

An exemplary model depicting a digital image 100 using pixels arranged as a two-dimensional grid is shown in FIG. 1. The digital image 100 is defined as having a Width 110 and a Height 120, in unit of pixel. The resolution of Digital image 100 is therefore Width 110×Height 120 pixels. Furthermore, the Digital image 100 is defined to have four edges, namely, a Topmost edge 130, a Rightmost edge 140, a Bottommost edge 150, and a Leftmost edge 160. The Topmost edge 130 comprises every pixel on a straight line bounded by two end pixels, namely, the Top-leftmost pixel 135 and the Top-rightmost pixel 145. The Rightmost edge 140 comprises every pixel on a straight line bounded by two end pixels, namely, the Top-rightmost pixel 145 and the Bottom-rightmost pixel 155. The Bottommost edge 150 comprises every pixel on a straight line bounded by two end pixels, namely, the Bottom-rightmost pixel 155 and the Bottom-leftmost pixel 165. The Leftmost edge 160 comprises every pixel on a straight line bounded by two end pixels, namely, the Bottom-leftmost pixel 165 and the Top-leftmost pixel 135. The exemplary model of Digital image 100 will be used throughout the as a mean to describe the underlying inventive concepts and should not be construed as a limitation of the disclosure. For example, the inventive concepts can be applied to a digital image using pixels arranged in various ways including, for example, a three-dimensional grid.

Figure 2A:
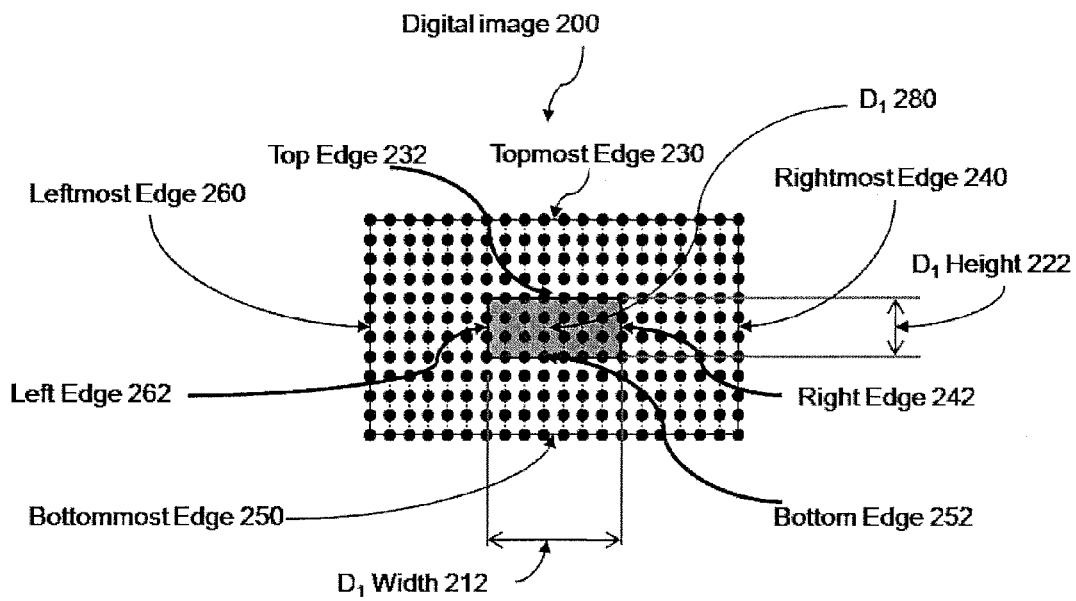
FIG. 2A shows another exemplary model of a digital image, where a first region that corresponds to a quadrangle digital image is defined within the digital image.

Now referring to FIG. 2A, a region, $D_1$ 280, of the Digital image 200 is defined as a quadrangle digital image that is surrounded by a Top edge 232, a Right edge 242, a Bottom edge 252 and a Left edge 262. $D_1$ 280 comprises all the pixels within the region including the pixels of the Top edge 232, the Right edge 242, the Bottom edge 252 and the Left edge 262. Furthermore, $D_1$ 280 is specified to have a $D_1$ Width 212 and a $D_1$ Height 222, in unit of pixel. An exemplary location of the region $D_1$ 280 is shown in FIG. 2A to be within the Digital image 200, near its center. Various locations of the region $D_1$ 280 are possible within, and including, the boundary edges of the Digital image 200 as defined by a Topmost edge 230, a Rightmost edge 240, a Bottommost edge 250, and a Leftmost edge 260. For example, a possible location of D1 280 can be at the top-leftmost corner of the Digital image 200 such that the Left edge 262, of $D_1$ 280, is collinear with the Leftmost edge 260 of the Digital image 200. Furthermore, the Top edge 232, of $D_1$ 280, is collinear with the Topmost edge 230 of the Digital image 200.

Figure 2B:
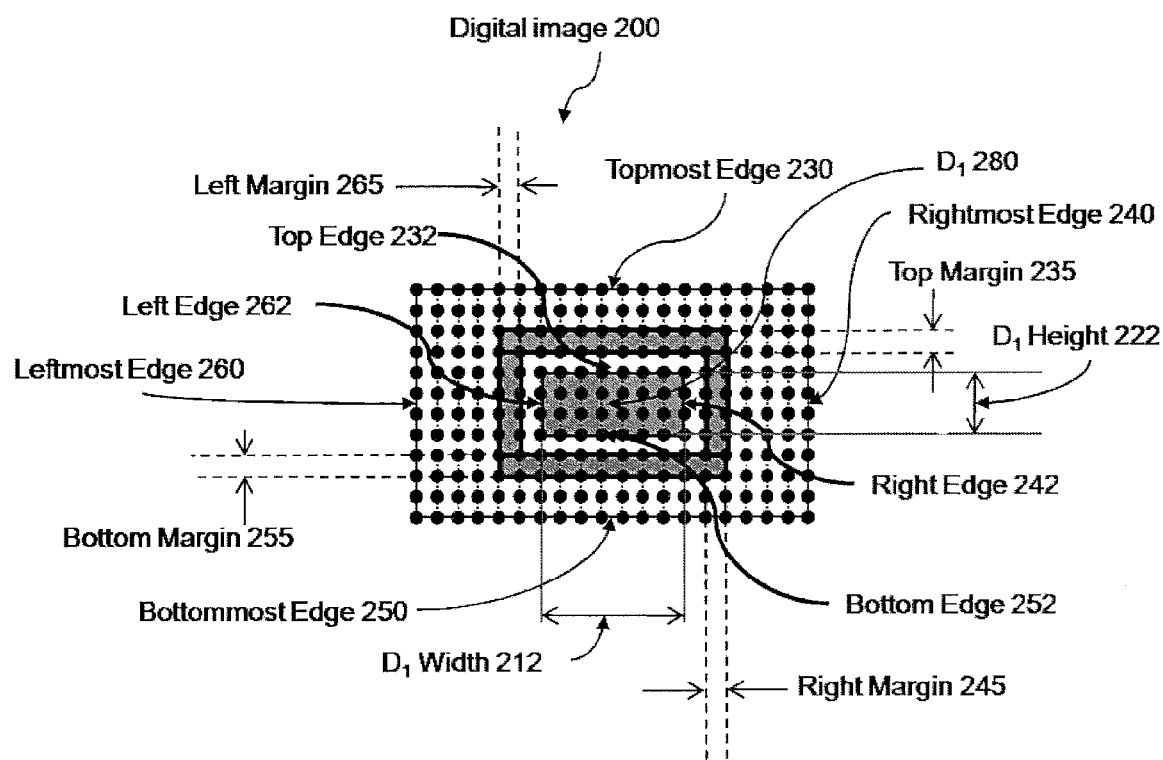
FIG. 2B shows another exemplary model of a digital image, where a second region, which comprises the first region, is defined within the digital image and corresponds to a quadrilateral digital image, in accordance with one embodiment.

Referring to FIG. 2B, a Top margin 235 is defined as a certain number of pixels in the vertical direction and above the Top edge 232, regardless of whether the Top edge 232 is at the boundary of the Digital image 200, i.e. the Top edge 232 is collinear with the Topmost edge 230. Similarly, a Bottom margin 255 is defined as a certain number of pixels in the vertical direction and below the Bottom edge 252, regardless of whether the Bottom edge 252 is at the boundary of the Digital image 200, i.e. the Bottom edge 252 is collinear with the Bottommost edge 250. In addition, a Right margin 245 is defined as a certain number of pixels in the horizontal direction and to the right of the Right edge 242, regardless of whether the Right edge 242 is at the boundary of the Digital image 200, i.e. the Right edge 242 is collinear with the Rightmost edge 240. Similarly, a Left margin 265 is defined as a certain number of pixels in the horizontal direction and to the left of the Left edge 262, regardless of whether the Left edge 262 is at the boundary of the Digital image 200, i.e. the Left edge 262 is collinear with the Leftmost edge 260. Subsequently, a new region of the Digital image 200 can now be defined to comprise the region $D_1$ 280 and all of the surrounding pixels as defined by the Top, Bottom, Right and Left margins around $D_1$ 280 regardless of whether any pixel of any one of the Top, Bottom, Right and Left margins exist within the Digital image 200. This will be described in further details in the following paragraphs.

Figure 3A:
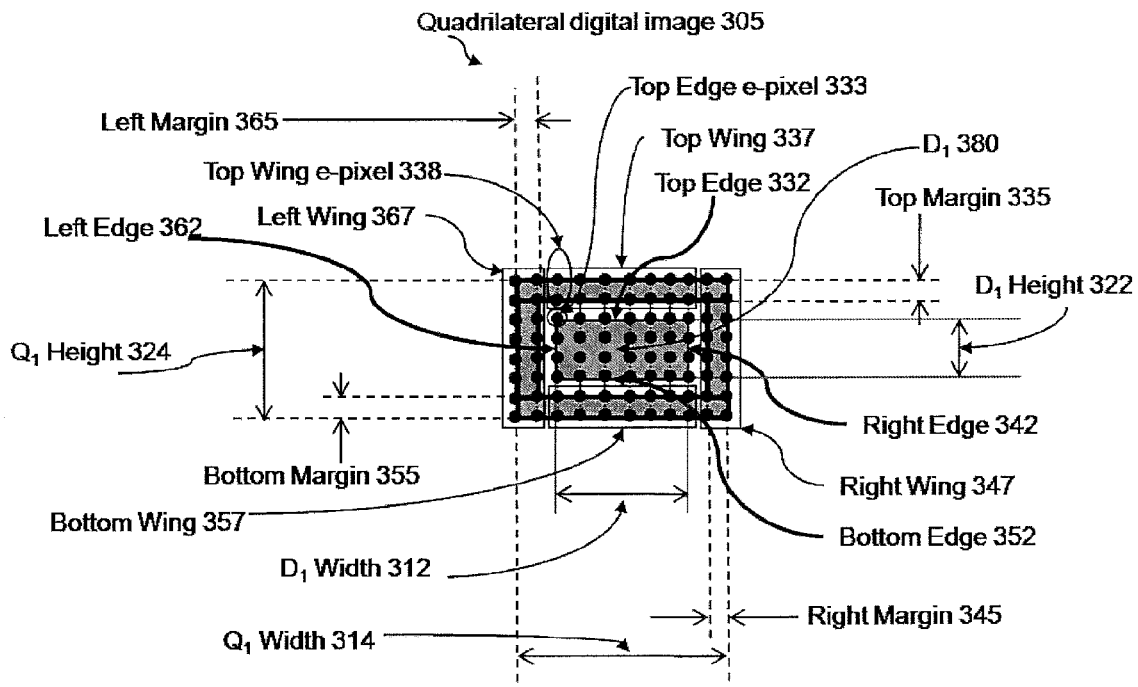
FIG. 3A shows an exemplary model of a quadrilateral digital image that comprises a quadrangle digital image surrounded by margin pixels, in accordance with another embodiment.

Referring to FIG. 3A, a newly defined quadrilateral digital image 305 is shown comprising a first region determined as quadrangle digital image $D_1$ 380. The actual number of pixels, as drawn in FIG. 3A, will be used as an additional illustrative mean in order to describe the relationship between the quadrilateral digital image 305 and the quadrangle digital image $D_1$ 380. For example, $D_1$ 380 is determined using a $D_1$ Width 312, which corresponds to seven pixels as shown, and a $D_1$ Height 322, which corresponds to four pixels as shown. Thus, the resolution of the region defined by $D_1$ 380 is determined to be 7×4, or a total of 28 pixels. Furthermore, the four edges of the quadrangle digital image $D_1$ 380 are defined as follows: a Top edge 332 comprising the seven topmost pixels of $D_1$ 380, a Right edge 342 comprising the four rightmost pixels of $D_1$ 380, a Bottom edge 352 comprising the seven bottommost pixels of $D_1$ 380, and a Left edge 362 comprising the four leftmost pixels of $D_1$ 380. It is thus clear that the region $D_1$ 380 comprises all the pixels that are determined to be within its four edges including the pixels located at the Top edge 332, the Right edge 342, the Bottom edge 352 and the Left edge 362. We will now describe a second region of the quadrilateral digital image 305.

In one embodiment, the second region of the quadrilateral digital image 305 is determined using a Top margin 335, a Right margin 345, a Bottom margin 355, and a Left margin 365 using the same number of pixels. For example, each of the Top margin 335, the Right margin 345, the Bottom margin 355, and the Left margin 365 comprises at least one pixel. An exemplary margin of two pixels is used for all Top, Right, Bottom, and Left margins, as shown in FIG. 3A. The quadrilateral digital image 305 is then determined and is specified using a $Q_1$ Width 314 and a $Q_1$ Height 324, in accordance with the following relationships:

$$Q_1 \text{ Width } 314 = (\text{Left Margin } 365 + D_1 \text{ Width } 312 + \text{Right Margin } 345) \qquad \text{Eq. 1}$$

$$Q_1 \text{ Height } 324 = (\text{Top Margin } 335 + D_1 \text{ Height } 322 + \text{Bottom Margin } 355) \qquad \text{Eq. 2}$$

Accordingly, for the exemplary drawing shown in FIG. 3A, the $Q_1$ Width 314 is computed to be eleven pixels, (2+7+2), and the $Q_1$ Height 324 is computed to be eight pixels, (2+4+2). Therefore, the total resolution of the quadrilateral digital image 305 is 11×8 or a total of 88 pixels as compared with a 7×4 or a total of 28 pixels for $D_1$ 380. Furthermore, the quadrangle digital image $D_1$ 380 is centered within the quadrilateral digital image 305 using the Top margin 335, the Right margin 345, the Bottom margin 355, and the Left margin 365. In another embodiment, each of the Top margin 335, the Right margin 345, the Bottom margin 355, and the Left margin 365 may be defined using a different number of pixels, and therefore the quadrangle digital image $D_1$ 380 may somewhat be off-centered within the quadrilateral digital image 305 as would be determined by the number of margin pixels.

In accordance with one embodiment, the data information for each pixel located in any of the Top margin 335, the Right margin 345, the Bottom margin 355, and the Left margin 365 is generated using existing data information from any one pixel of the quadrangle digital image $D_1$ 380, or using predetermined color data information, or any combination thereof. The predetermined color data information may corresponds to any color including black color. In accordance with another embodiment, a Top Wing 337 is defined to comprise at least one row of pixels that are located directly above the Top Edge 332. For example, the Top Wing 337 comprises two pixels, identified as Top Wing e-pixel 338, that are immediately above the correspondent pixel, Top Edge e-pixel 333, in the vertical direction, as shown in FIG. 3A. In accordance with yet another embodiment, the Top Wing 337 is defined to comprise at least one pixel, Top Wing e-pixel 338, that is directly above a correspondent pixel, Top Edge e-pixel 333, in the vertical direction. It is important to note that the Top Wing e-pixel 338 data information may be generated using various direct or indirect manipulation, duplication, or management of the data information of the pixel, Top Edge e-pixel 333, as is generally known to those of ordinary skill in the art. In accordance with another embodiment, the Top Wing e-pixel 338 data information is generated using the data information of the pixel, Top Edge e-pixel 333, or any other pixel that is located on the Top edge 332. In accordance with yet another embodiment, the Top Wing e-pixel 338 data information is generated using direct or indirect manipulation, duplication, or management of the data information of the pixel, Top Edge e-pixel 333, in combination with a predetermined data information that may corresponds to specific color, for example black, gray or any other color. In accordance with a preferred embodiment, the Top Wing e-pixel 338 data information is generated, on the fly during the processing of the quadrangle digital image $D_1$ 380, using data information of the pixel, Top Edge e-pixel 333, or any other pixel that is located on the Top edge 332. In accordance with yet another preferred embodiment, the Top Wing e-pixel 338 data information is generated, on the fly during the processing of the quadrangle digital image $D_1$ 380, using any one, or a combination, of the embodiments described above. In addition, a Bottom Wing 357 comprises at least one row of pixels that are located directly below the Bottom Edge 352. The data information for the Bottom Wing 357 pixels is generated, using corresponding pixels that are located on the Bottom Edge 352 and in a similar fashion and means as described above for the Top Wing 337.

In accordance with a preferred embodiment, a Left Wing 367 comprises at least one column of pixels that is located immediately to the left of the Left Edge 362 of the quadrangle digital image $D_1$ 380. The data information for the Left Wing 367 pixels is generated using data information of the corresponding pixels that are identified as the leftmost pixels of the Top Wing 337, Top Wing e-pixel 338 as shown the in FIG. 3A, the pixels of the Left Edge 362 of the quadrangle digital image $D_1$ 380, and the leftmost pixels of the Bottom Wing 357, and in a similar fashion and means as described above for the Top Wing 337, as described above. For example, the data information for the Left Wing 367 pixels can be generated using a direct or indirect manipulation, duplication, and/or management processes of the data information of the pixels that are located on any one of the edges of the quadrangle digital image $D_1$ 380. Furthermore, the data information can be created using predetermined color information, including data information that corresponds to black color, or any other color. Any combination of the above methods may be employed singularly or in combination to generate the data information for the Left Wing 367 pixels thereof. In addition, various methods based on mathematical or algorithmic means to generate, possibly on the fly, the data information needed for each of the margin pixels may also be used and may be implemented in combination of any of the other methods described above. Similarly, a Right Wing 347 comprises at least one column of pixels that is located immediately to the right of the Right Edge 342 of the quadrangle digital image $D_1$ 380. The data information for the Right Wing 347 pixels is generated using data information of the corresponding pixels that are identified as the rightmost pixels of the Top Wing 337, the pixels of the Right Edge 342 of the quadrangle digital image $D_1$ 380, and the rightmost pixels of the Bottom Wing 357, and in a similar fashion and means as described above for the Top Wing 337, including various methods as described above.

In another embodiment, changing the order of the data information that is generated first, i.e. Right Wing 347 & the Left Wing 367, and then data information for the Top Wing 337 & the Bottom Wing 357 would result in a change of the number of pixels being processed in each of the steps identified above for each one of the Right Wing 347, the Left Wing 367, the Top Wing 337, and the Bottom Wing 357 but does not change the underlying inventive concepts as described above and this flexibility would be appreciated by those skilled in the art. As will be described and shown in the following paragraphs, the definition of the quadrilateral digital image 305 will be used in the processing of an arbitrary digital image, which is split into multiple quadrangle regions, $D_1$, $D_2, D_3, \ldots, D_z$. The margin pixels are then either determined or created, as described above, for each of the multiple quadrangle regions, $D_z$. Sometimes these margin pixels are part of the arbitrary digital image and sometimes the margin pixels are generated based on any one, or any combination, of methods as described above. A new quadrilateral digital image, $Q_z$, is then created from the concatenation of each of the multiple quadrangle regions, $D_z$, and its own margin pixels.

Figure 3B:
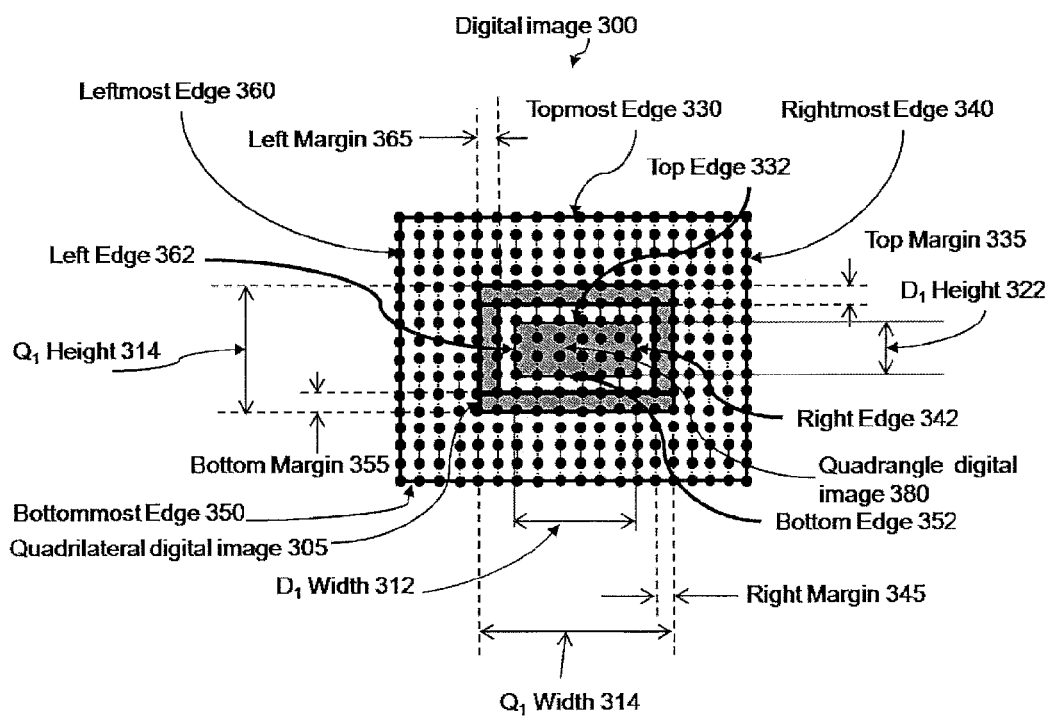
FIG. 3B shows an exemplary model of a quadrilateral digital image of FIG. 3A that is centered within the edges of a digital image, in accordance with another embodiment.
Figure 3C:
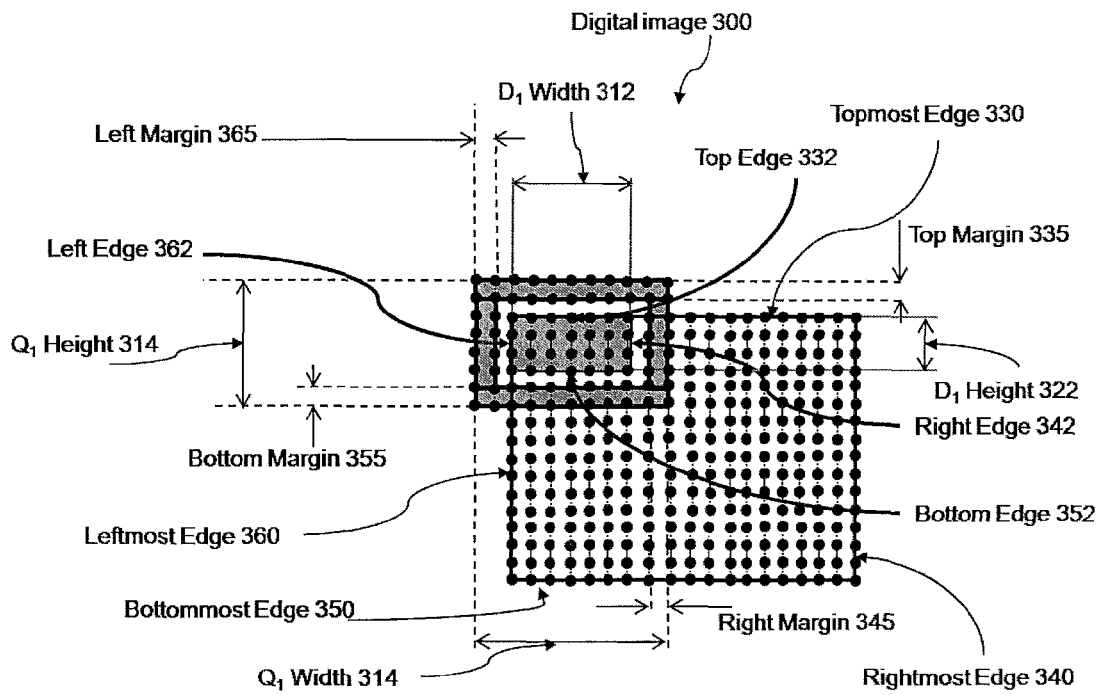
FIG. 3C shows an exemplary model of a quadrilateral digital image of FIG. 3A that is located at the top-left corner of a digital image, in accordance with another embodiment.
Figure 3D:
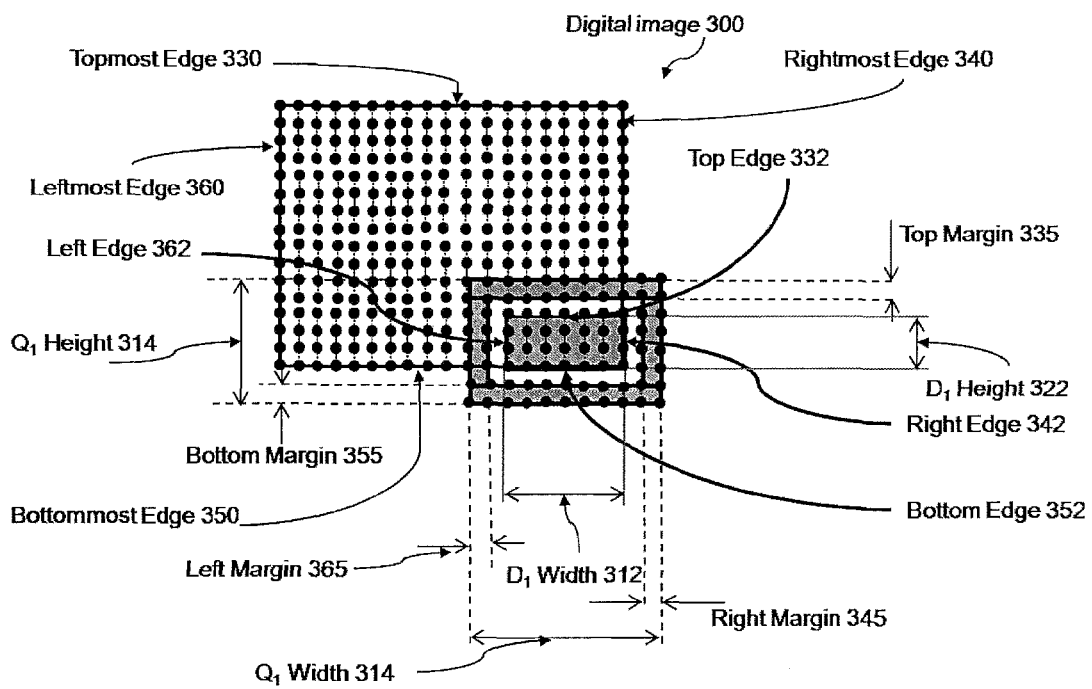
FIG. 3D shows an exemplary model of a quadrilateral digital image of FIG. 3A that is located at the bottom-right corner of a digital image, in accordance with another embodiment.

Now referring to FIG. 3B, an exemplary digital image 300 comprising a quadrilateral digital image 305 and a quadrangle digital image 380, as described above. A $D_1$ Width 312 and $D_1$ Height 322 define the quadrangle digital image 380. Accordingly, $Q_1$ Width 314 and $Q_1$ Height 324 define the quadrilateral digital image 305 and are determined in accordance with Eq. 1 and Eq. 2 listed above. In accordance with one embodiment, the quadrilateral digital image 305 is within any one of a Topmost edge 330, a Rightmost edge 340, a Bottommost edge 350, and a Leftmost edge 360 of the digital image 300, as shown in FIG. 3B. In accordance with another embodiment, the quadrilateral digital image 305 is located at the top-left corner of the digital image 300, as shown in FIG. 3C. In accordance with yet another embodiment, the quadrilateral digital image 305 is located at the bottom-right corner of the digital image 300, as shown in FIG. 3D. Therefore, the location of the quadrangle digital image 380 within the digital image and the depth of each of the Top margin 335, the Right margin 345, the Bottom margin 355, and the Left margin 365 will determine the location of the margin pixels and thus the pixels' data information is determined using various methods as described above. In accordance with one embodiment, if the margin pixels are located within anyone of the Topmost edge 330, the Rightmost edge 340, the Bottommost edge 350, and the Leftmost edge 360 of the digital image 300 then the data information is duplicated from the correspondent pixels of digital image 300. In accordance with another embodiment, if the margin pixels are located beyond anyone of the Topmost edge 330, the Rightmost edge 340, the Bottommost edge 350, and the Leftmost edge 360 of the digital image 300 then the data information is generated or created using various methods as described above. Please note that an effort is made to keep the nomenclature of FIG. 3A through FIG. 3D consistent, with the exception of the location of the quadrilateral digital image 305 within the digital image 300, see FIG. 3B through FIG. 3D. Some objects names were left off some of FIG. 3A-D for increasing the drawing clarity, it is clear that FIG. 3A through FIG. 3D are used to show exemplary locations of quadrilateral digital image 305 for illustrative purposes.

Therefore, data information is generated for certain margin pixels that are determined to be beyond the Topmost edge 330 and the Leftmost edge 360, see FIG. 3C. The remaining margin pixels that are determined to be within the Rightmost edge 340 and the Bottommost edge 350, would comprise data information from the correspondent pixels of the digital image 300. In accordance with one embodiment, data information is generated for at least one pixel of the quadrilateral digital image 305 that is above the Topmost edge 330 of the digital image 300 if the Top edge 332 of the quadrangle digital image 380 is collinear with the Topmost edge 330 of the digital image 300. Similarly, data information is generated for at least one pixel of the quadrilateral digital image 305 that is to the left of the Leftmost edge 360 of the digital image 300 if the Left edge 362 of the quadrangle digital image 380 is collinear with the Leftmost edge 360 of the digital image 300. Various methods and steps may be used, as described above. However, the data information for each margin pixel may be generated based on at least one of the following: (i) using data information of at least one pixel that is located on the Top edge 332 of the quadrangle digital image 380, (ii) using data information of at least one pixel that is located to the left of the Top edge 332 of the quadrangle digital image 380 (see FIG. 3B), (iii) using data information of at least one pixel that is located to the right of the Top edge 332 of the quadrangle digital image 380, (iv) using data information of at least one pixel that is located anywhere on the Topmost edge 330 of the digital image 300, and (v) using data information that corresponds to any color, including black.

Now referring to FIG. 3D, data information is generated for certain margin pixels that are determined to be beyond the Bottommost edge 350 and the Rightmost edge 340. The remaining margin pixels that are determined to be within the Leftmost edge 360 and the Topmost edge 330, would comprise data information from the correspondent pixels of the digital image 300. In accordance with one embodiment, data information is generated for at least one pixel of the quadrilateral digital image 305 that is below the Bottommost edge 350 of the digital image 300 if the Bottom edge 352 of the quadrangle digital image 380 is collinear with the Bottommost edge 350 of the digital image 300. Similarly, data information is generated for at least one pixel of the quadrilateral digital image 305 that is to the right of the Rightmost edge 340 of the digital image 300 if the Right edge 342 of the quadrangle digital image 380 is collinear with the Rightmost edge 340 of the digital image 300. Various methods and steps may be used, as has been described above. However, the data information for each margin pixel may be generated based on at least one of the following: (i) using data information of at least one pixel that is located on the Bottom edge 352 of the quadrangle digital image 380, (ii) using data information of at least one pixel that is located to the left of the Bottom edge 352 of the quadrangle digital image 380, (iii) using data information of at least one pixel that is located to the right of the Bottom edge 352 of the quadrangle digital image 380 (see FIG. 3B), (iv) using data information of at least one pixel that is located anywhere on the Bottommost edge 350 of the digital image 300, and (v) using data information that corresponds to any color, including black.

Figure 4A:
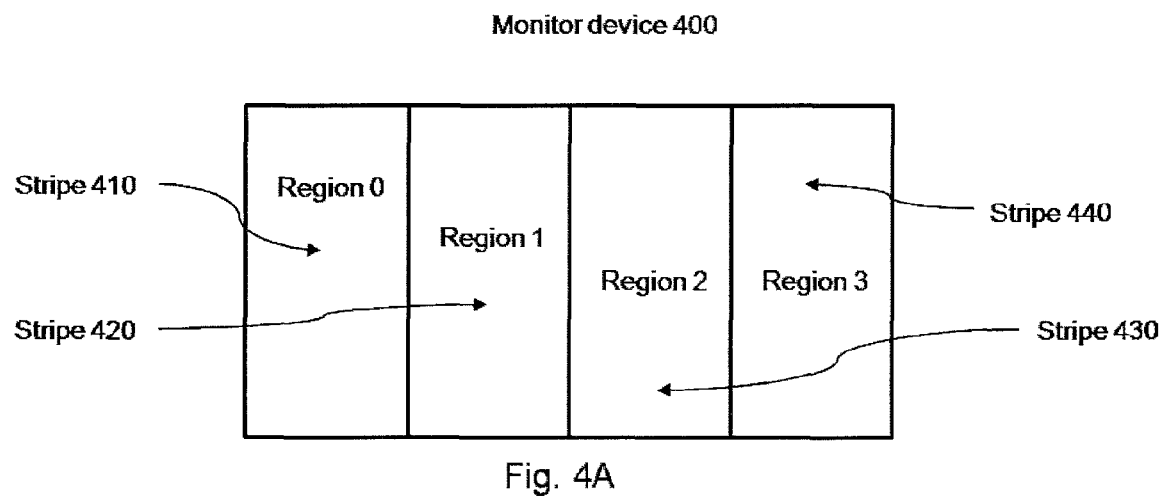
FIG. 4A shows an exemplary electronic display panel system that is split using four regions or stripes.
Figure 4B:
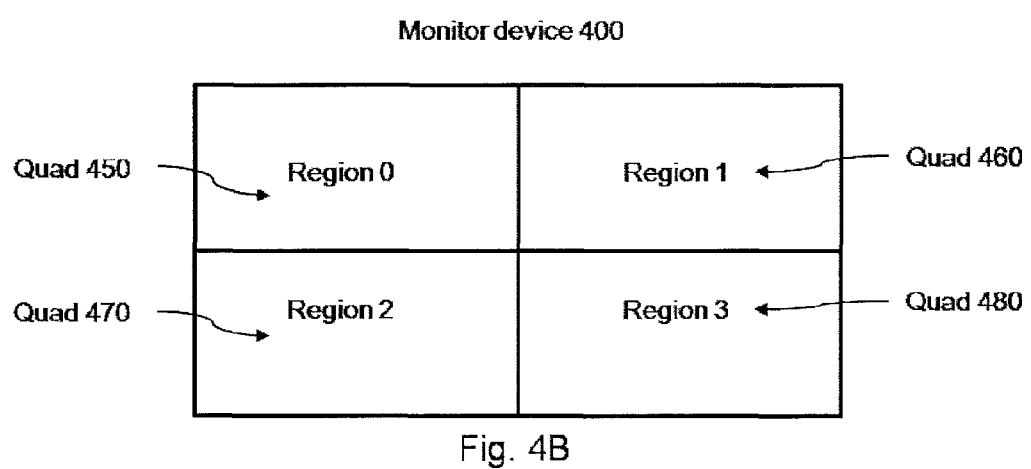
FIG. 4B shows an exemplary electronic display panel system split using with four regions or quadrants.

An electronic display panel, may be referred to as monitor, are used in an ever increasing number of applications that generates very high resolution digital images or demands the ability to display multiple high resolution images. One such exemplary monitor is shown in FIG. 4A, where the monitor device 400 screen (or panel) is split into four Stripes, namely Stripe 410, Stripe 420, Stripe 430, and Stripe 440 that corresponds to the actual screen region define by the panel Region 0, Region 1, Region 2, and Region 3 respectively. Every one of Region 0, Region 1, Region 2, and Region 3 corresponds to a high definition, HD, picture resolution, namely 1920×1080.

The splitting of the monitor device 400 screen into four HD regions would overcome many of the challenges associated with the production of a monitor with a single region having a resolution of 3840×2160, and would be at a lower cost and more power efficient. Such monitors are currently available and may be referred to as Quad-HD monitor. The splitting of the screen into multiple regions does present several challenges. For example, when using an HD resolution digital image, it can be displayed well within any one of the four regions of the monitor device 400, namely Region 0, Region 1, Region 2, and Region 3. However, the resultant displayed image will suffer from artifacts at the boundaries of the four regions where the resultant pixels of each region may not be properly or timely placed or aligned with the pixels of the adjacent region.

Figure 5:
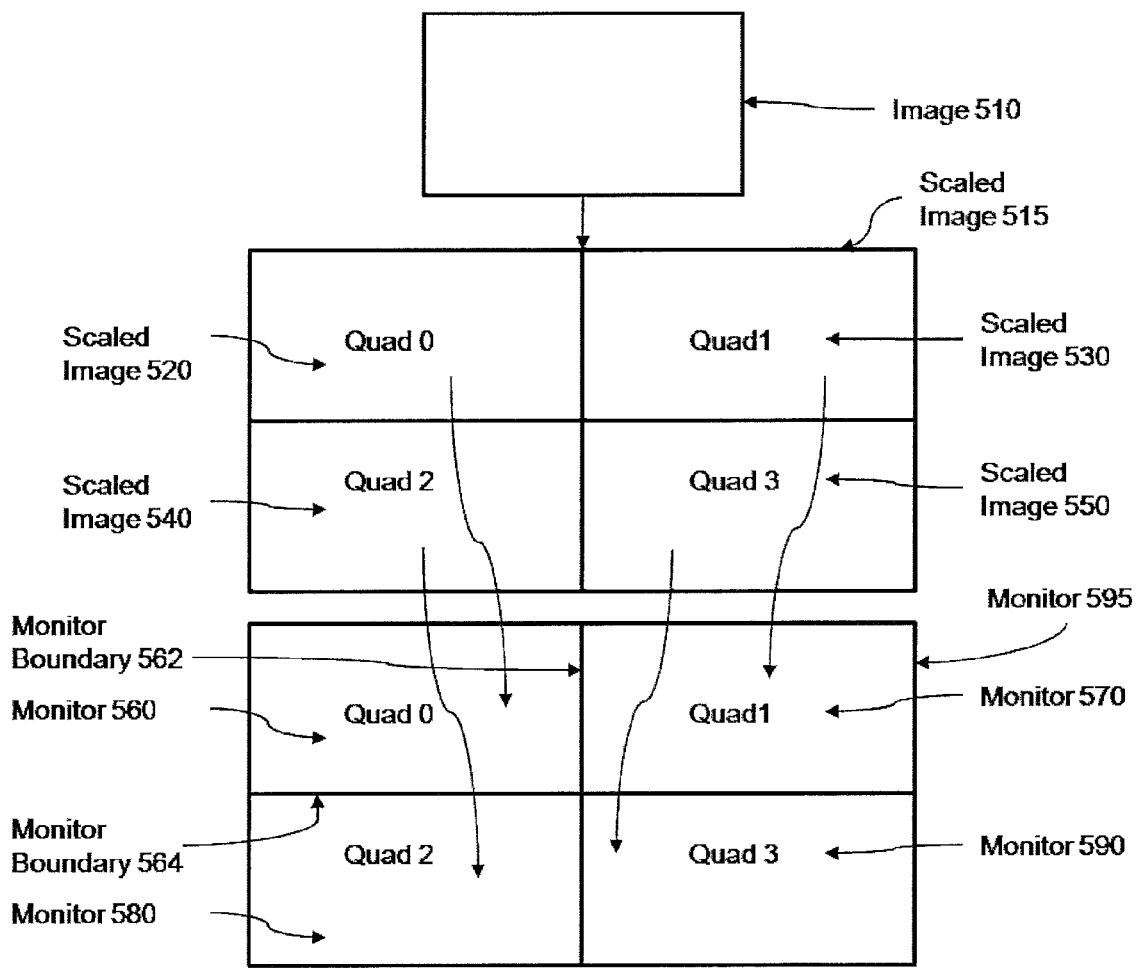
FIG. 5 shows an exemplary way of scaling a digital image that is to be displayed using an electronic display panel that is split into four regions.

An exemplary process of displaying an Image 510 using a Scaled image 515 and a quad display Monitor 595 will be described as shown FIG. 5. First, the Image 510 is scaled up to a resolution that correspond to the resolution of the Monitor 595. The Scaled image 515 is split into four quadrangle scaled images, namely Scaled image 520, Scaled image 530, Scaled image 540, and Scaled image 550. Each of the four quadrangle scaled images having a resolution that correspond to the resolution of a correspondent region of Monitor 595, namely Monitor 560, Monitor 570, Monitor 580, Monitor 590, such that Quad 0 of the Scaled image 520 is displayed using the display region defined by Quad 0 of Monitor 560. Other quadrants of the Scaled image 515 are then respectively displayed using the appropriate quadrant of the display Monitor 595. Accordingly the consequential display of the individual four quadrant of Monitor 595 should reproduce the original Image 510 using the full resolution of Monitor 595. However, annoying visual artifacts resulting from the improper alignment of the displayed pixels located at a common vertical Monitor boundary 562 and/or a horizontal Monitor boundary 564 can be easily viewed especially during video playback of fast moving objects across the four quadrants of the display Monitor 595. The inventive concepts developed by Marseille Networks and described above will be used and described in the following paragraph to faithfully reproduce the Image 510 using Monitor 595 with multiple defined regions.

Figure 6A:
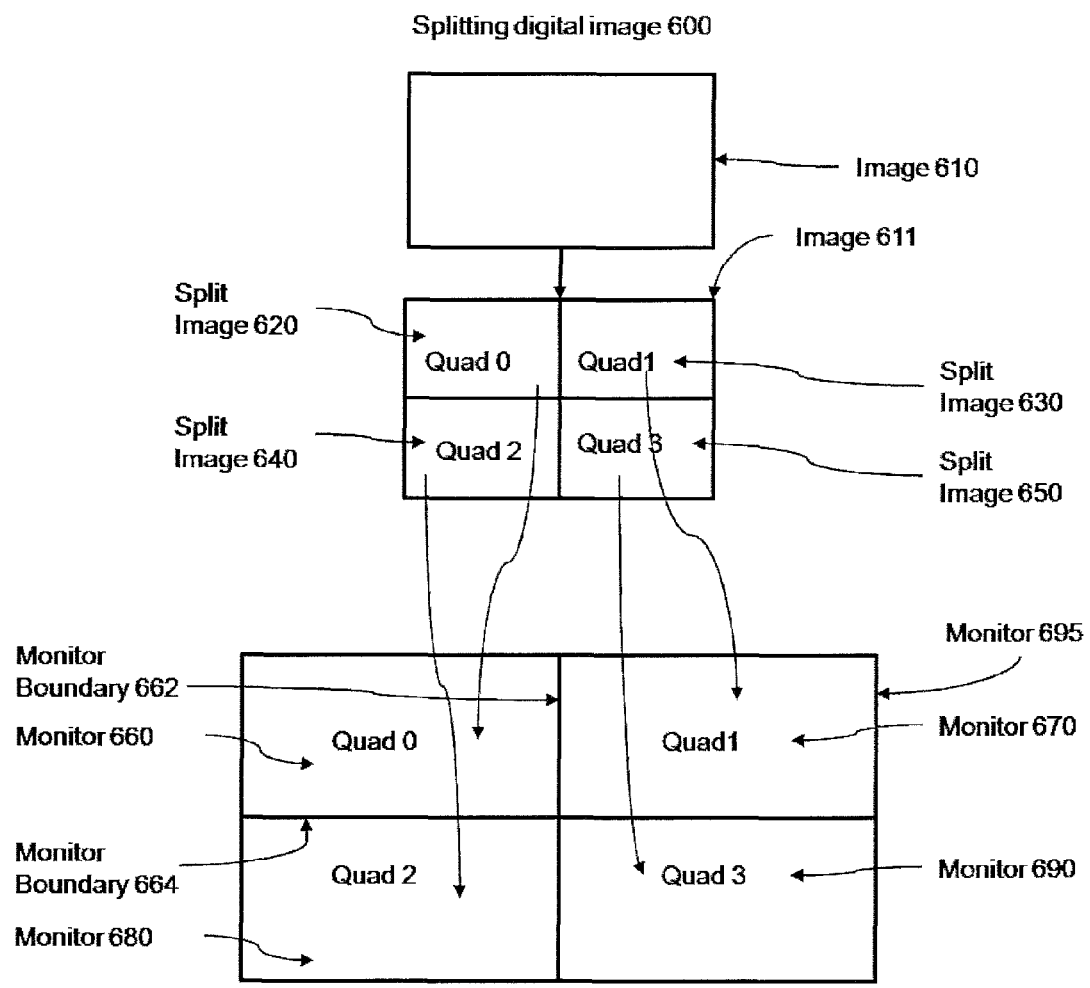
FIG. 6A shows an exemplary digital image that is split into four regions where each region is to be scaled individually and then displayed using an electronic display panel that is split into four regions, in accordance with another embodiment.

Referring to FIG. 6A, the process of displaying an Image 610 using Monitor 695 having four quadrant, namely Monitor 660, Monitor 670, Monitor 680, Monitor 690 is described in accordance with one embodiment. An Image 611 is a processed version of Image 610. The Image 611 is split into four regions, namely Split image 620, Split image 630, Split image 640, and Split image 650, that corresponds to and in proportion to the number of regions of the Monitor 695, namely Monitor 660, Monitor 670, Monitor 680, Monitor 690 respectively. Each one of the Split image 620, Split image 630, Split image 640, and Split image 650 is individually processed and scaled up to the resolution required by the correspondent region of the Monitor 695. In another embodiment, if the Image 610 is already at the full resolution of Monitor 695, then there may not be a need for any processing to produce Image 611, and the Image 611 may be same as Image 610. The processing of each of the Split image 620, Split image 630, Split image 640, and Split image 650 may not include scaling since each of the individual regions of the Image 611 is already at the full resolution of the correspondent region of the Monitor 695.

Figure 6B:
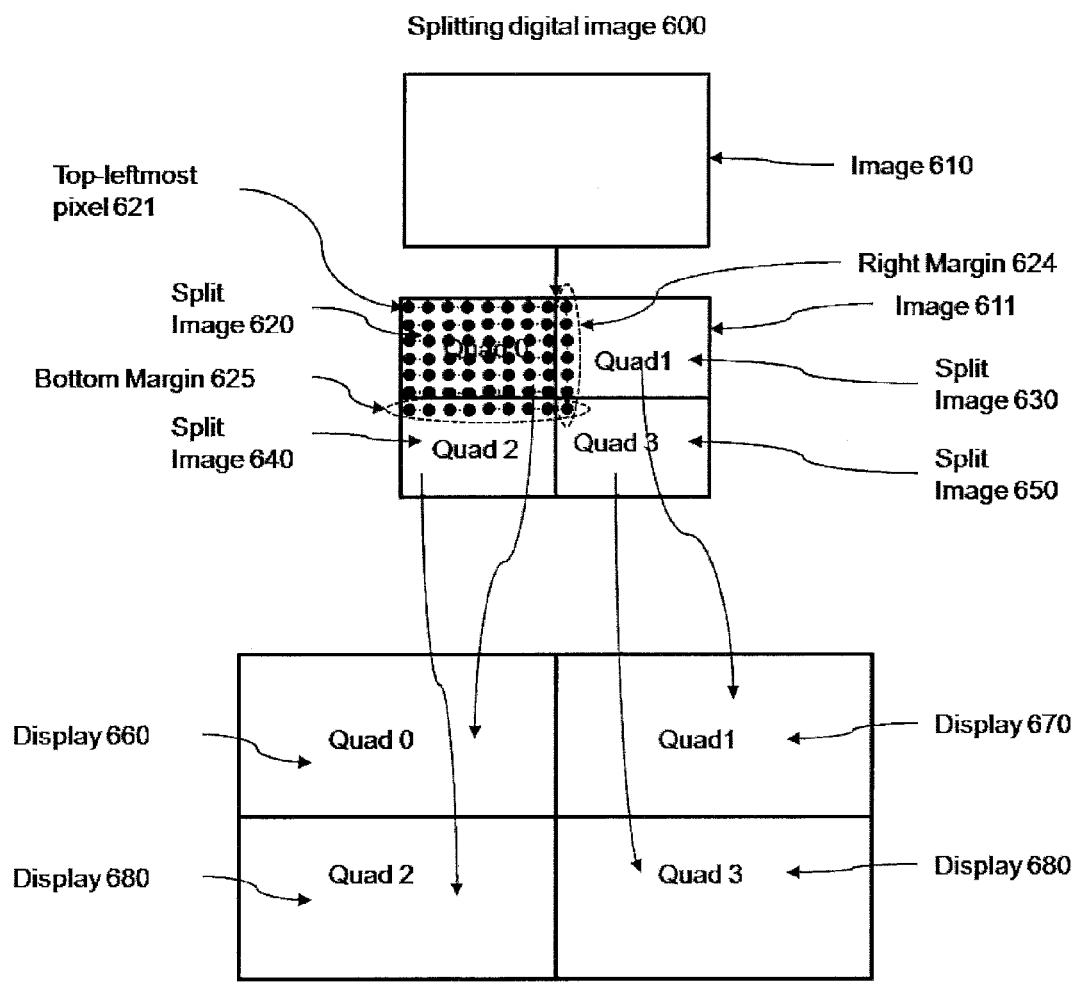
FIG. 6B shows exemplary right margin and bottom margin pixels that are used for scaling the top-left region of the digital image of FIG. 6A, in accordance with another embodiment.
Figure 6C:
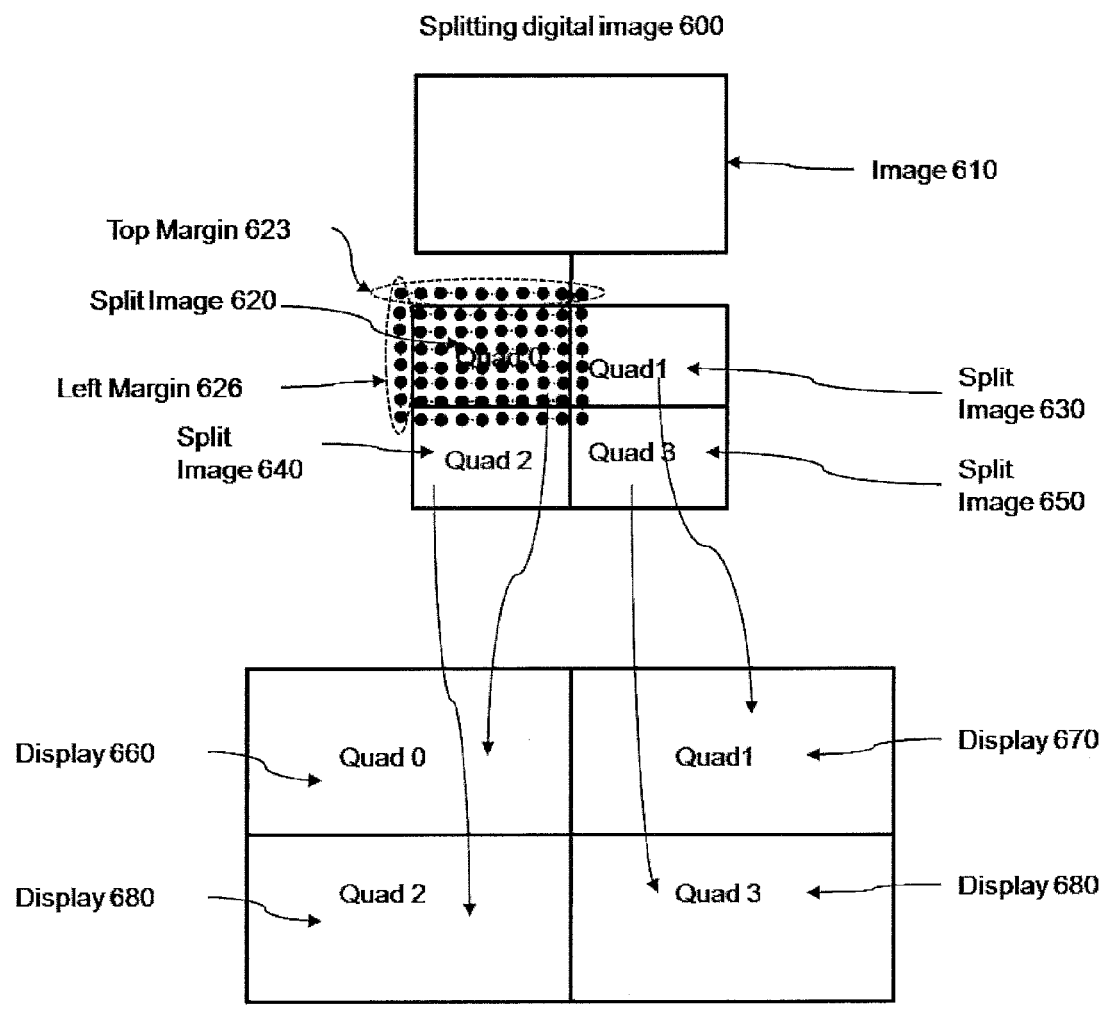
FIG. 6C shows exemplary top margin and left margin pixels that are used for scaling the bottom-right region of the digital image of FIG. 6A, in accordance with another embodiment.

Now referring to FIG. 6B, and using a Split Image 620, corresponding to Quad 0, as an exemplary region of the Image 611 for processing. Exemplary pixels, for illustrative purposes, are arranged in two-dimensional grid format over the entire region, Quad 0, and a Top-leftmost pixel 621 is shown at the top left corner of the Split image 620. The inventive concepts described above are applied to the Split image 620, which corresponds to a quadrangle digital image to be processed. Since the region, Quad 0, is at the top-left quadrant of the Image 611, then a Right margin 624 and a Bottom margin 625 are generated from existing pixels that are part of Split image 630, Split image 640, and Split image 650, as shown in FIG. 6B. Furthermore, since the region, Quad 0, is at the top-left quadrant of the Image 611, then top edge of Split image 620 is collinear with the topmost edge of the Image 611. Similarly, the left edge of Split image 620 is collinear with the leftmost edge of the Image 611. Therefore, a Top margin 623 and a Left margin 626 are created using any one, or a combination of various methods as described above. In order to keep the clarity of the drawings as shown in FIG. 6A through 6C some objects have not been named but the intended meaning should be very clear from FIG. 6A-6C and while referencing back to the detailed drawings of FIG. 3A through FIG. 3D.

Figure 7A:
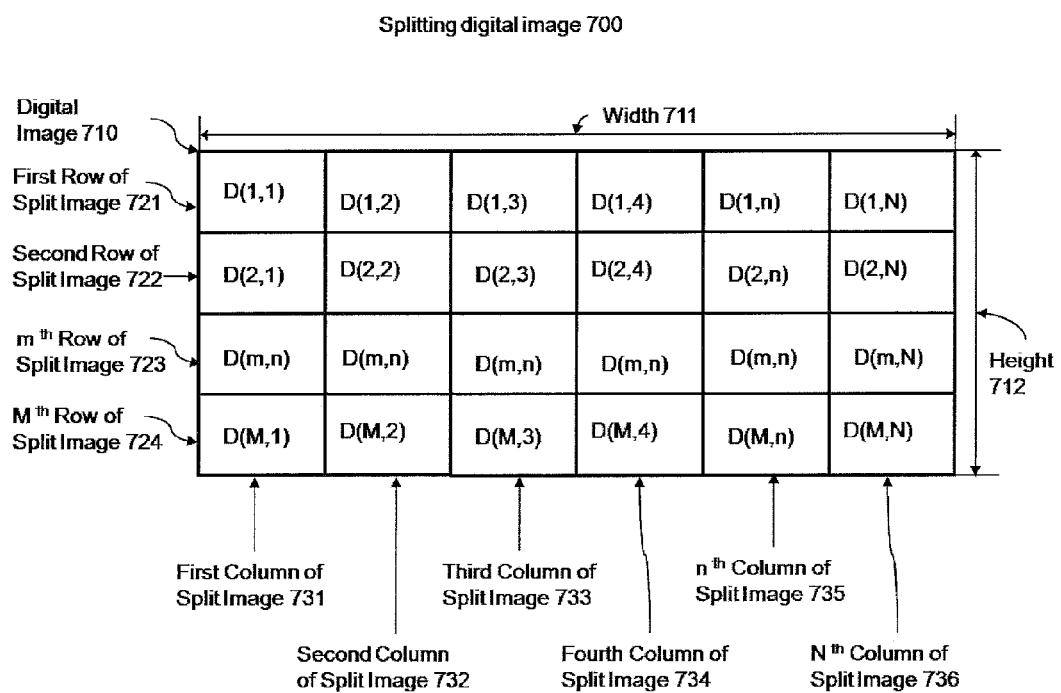
FIG. 7A shows an exemplary partitioning of a digital image into multiple portions using M rows and N columns, in accordance with another embodiment.

A Digital image 710 having a topmost edge, a bottommost edge, a leftmost edge, and a rightmost edge is split into M rows and N columns, and thus defining an M×N array of quadrangle digital images, each of which is identified as $D_{(m,n)}$, as shown in FIG. 7A. The index m represent any one integer of a first range of consecutive integers, wherein the first range corresponds to the number of rows M, and a column index, n, that is any one integer of a second range of consecutive integers, wherein the second range corresponds to the number of columns N. In accordance with one embodiment, every element of the M×N array correspond to a region comprising a quadrangle digital image, and the inventive concepts as described above are applied to each region individually. In accordance with another embodiment, multiple of the elements of the M×N array may be combined to form a single quadrangle digital image and thus can be processed accordingly.

Figure 7B:
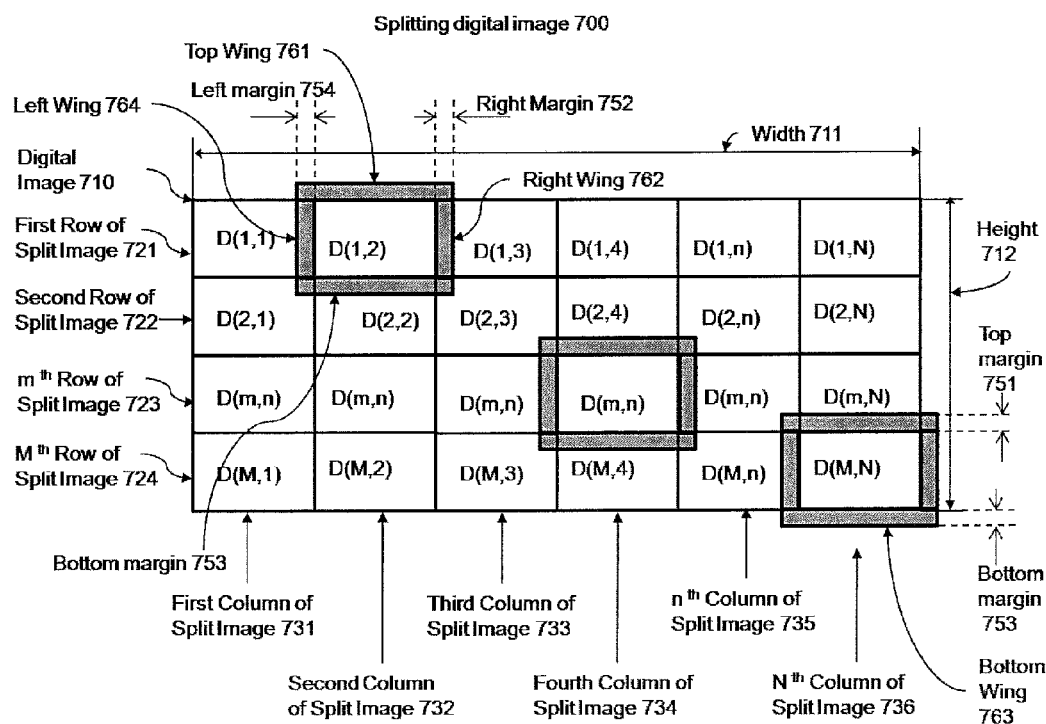
FIG. 7B shows exemplary Top, Right, Bottom, and Left margin of exemplary portions, namely D(1,2), D(m,n) and D(M,N), of the digital image of FIG. 7A, in accordance with another embodiment

Margin pixels are determined for an exemplary $D_{(1,2)}$, $D_{(m,n)}$ and $D_{(M,N)}$ as shown in FIG. 7B, for illustrative purposes. A Top margin 751, a Bottom margin 753, a Left margin 754, and a Right margin 752. A new quadrilateral digital images, $Q_{(m,n)}$, is generated comprising the $D_{(m,n)}$ portion of the digital image, as defined by the array element that corresponds to the quadrangle digital image $D_{(m,n)}$, and a second portion of the digital image, defined by the Top margin 751, the Bottom margin 753, the Left margin 754, and the Right margin 752. Each new quadrilateral digital images $Q_{(m,n)}$ is larger than the corresponding $D_{(m,n)}$ and in accordance with the following relationships:

$$Q_{(m,n)} \text{ width=Left margin}+D_{(m,n)} \text{ width+Right margin,} \quad \text{Eq. 3}$$

$$Q_{(m,n)} \text{ height=Top margin}+D_{(m,n)} \text{ height+Bottom margin,} \quad \text{Eq. 4}$$

Each of the quadrangle digital images $D_{(m,n)}$ is centered within the quadrilateral digital image $Q_{(m,n)}$ using the Top margin 751, the Bottom margin 753, the Left margin 754, and the Right margin 752. In addition, at least a first pixel of the quadrilateral digital image $Q_{D\ (m,n)}$ is determined to be located beyond any one of the topmost edge, the bottommost edge, the leftmost edge, and the rightmost edge of the Digital image 700 if any one of a $D_{(m,n)}$ top edge, a $D_{(m,n)}$ bottom edge, a $D_{(m,n)}$ left edge, and a $D_{(m,n)}$ right edge of a quadrangle digital image $D_{(m,n)}$, is collinear with any one of the topmost edge, the bottommost edge, the leftmost edge, and the rightmost edge of the Digital image 700. Appropriate data information is generated for the first pixel based on at least one of the following steps: (i) using data information of at least one pixel that is located on any one of the $D_{(m,n)}$ top edge, the $D_{(m,n)}$ bottom edge, the $D_{(m,n)}$ left edge, and the $D_{(m,n)}$ right edge of the correspondent quadrangle digital image $D_{(m,n)}$, (ii) using data information of at least one pixel that is located on any one of the topmost edge, the bottommost edge, the leftmost edge, and the rightmost edge of the Digital image 700, and (iii) using data information that corresponds to any color, including black.

In a similar fashion, data information for all margin pixels is determined first by checking if the margin pixels are within the Digital image 700 or are beyond any one any one of the topmost edge, the bottommost edge, the leftmost edge, and the rightmost edge of the Digital image 700. Various method of generating and/or creating data information for margin pixels have been described in details in this disclosure and are used here for every quadrilateral digital image $Q_{(m,n)}$. In accordance with another embodiment, it should be noted that the general solution described above for splitting any Digital image 700 into an array of M×N array of quadrangle digital images is not limited to two-dimensional arrangement of all elements of the array. For example, multi-dimensional arrangement of (M×N×Z) array of quadrangle digital images would benefit greatly and the inventive concepts here are easily applied to each element of the multi-dimensional arrangement of array that corresponds to a quadrangle digital image.

We claim:

1. A method of displaying a digital image having a first resolution using an electronic display having a second resolution greater than the first resolution, the method comprising:

receiving a first set of pixels of the digital image, wherein the first set of pixels corresponds to a first portion of the digital image, the first portion of the digital image corresponding to a first region of the electronic display device;

generating a second set of pixels corresponding to one or more of a top margin, a bottom margin, a left margin, and a right margin of the first portion of the digital image;

generating a third set of pixels using the first set of pixels and the second set of pixels, wherein the third set of pixels having a greater number of pixels than the first set of pixels; and displaying the third set of pixels using the first region of the electronic display device.

2. The method of claim 1, wherein the first set of pixels includes one or more pixels of at least one of a top edge, a bottom edge, a left edge, and a right edge of the first portion of the digital image.

3. The method of claim 1, wherein the second set of pixels includes at least one of (i) at least one neighboring pixel of the first portion of the digital image, and (ii) one or more generated pixels.

4. The method of claim 3, wherein the at least one neighboring pixel of the first portion of the digital image includes one or more pixels of the digital image that are adjacent to the first portion of the digital image.

5. The method of claim 3, wherein the one or more generated pixels include one or more pixels that are generated using data information of at least one of (i) one or more pixels of the first set of pixels of the digital image, (ii) one or more neighboring pixels of first portion of the digital image, and (iii) one or more colors including black.

6. The method of claim 1, wherein the generating of the second set of pixels is based at least in part on the location of the first portion of the digital image within the digital image.

7. The method of claim 2, wherein the second set of pixels includes one or more generated pixels when any one of the top edge, the bottom edge, the left edge, and the right edge of the first portion of the digital image is collinear with any one of a topmost edge, a bottommost edge, a leftmost edge, and a rightmost edge of the digital image.

8. The method of claim 1, wherein processing the first set of pixels and the second set of pixels to produce a third set of pixels further comprising:
processing data information of one or more pixels of at least one of a top edge, a bottom edge, a left edge, and a right edge of the first portion of the digital image;
processing data information of one or more pixels of at least one of the top margin, the bottom margin, the left margin, and the right margin of the first portion of the digital image; and
producing data information for one or more pixels of a third set of pixels.

9. A method of displaying a digital image using an electronic display device, the method comprising:
apportioning pixels of the digital image to a first region, a second region, a third region, and a fourth region of the digital image, wherein the first region of the digital image is located at a top-left portion of the digital image and corresponds to a top-left display region of the electronic display device;
generating one or more margin pixels for at least one of a first top margin, a first bottom margin, a first left margin, and a first right margin surrounding the first region of the digital image;
processing the first region of the digital image to produce a processed first region of the digital image for displaying in the top-left region of the electronic display device, wherein one or more pixels of the processed first region of the digital image are generated using one or more margin pixels and one or more pixels of the first region of the digital image; and
displaying the processed first region of the digital image using the top-left display region of the electronic display device.

10. The method of claim 9, wherein the generating one or more margin pixels for at least one of a first top margin, a first bottom margin, a first left margin, and a first right margin further comprising:
generating one or more margin pixels of the first top margin using at least one of (i) one or more pixels located on a top edge of the first region of the digital image, and (ii) one or more colors including black.

11. The method of claim 9, wherein the generating one or more margin pixels for at least one of a first top margin, a first bottom margin, a first left margin, and a first right margin further comprising:
generating one or more margin pixels of the first bottom margin using at least one of (i) one or more pixels located on a top edge of the second region of the digital image, (ii) one or more pixels of the first region of the digital image, and (iii) one or more colors including black, wherein the second region is located at a bottom-left portion of the digital image.

12. The method of claim 9, wherein the generating one or more margin pixels for at least one of a first top margin, a first bottom margin, a first left margin, and a first right margin further comprising:
generating one or more margin pixels of the first left margin using at least one of (i) one or more pixels located on a left edge of the first region of the digital image, and (ii) one or more colors including black.

13. The method of claim 9, wherein the generating one or more margin pixels for at least one of a first top margin, a first bottom margin, a first left margin, and a first right margin further comprising:
generating one or more margin pixels of the first right margin using at least one of (i) one or more pixels located on a left edge of the third region of the digital image, (ii) one or more pixels of the first region of the digital image, and (iii) one or more colors including black, wherein the third region is located at a top-right portion of the digital image.

14. The method of claim 9, wherein the generating one or more margin pixels for at least one of a first top margin, a first bottom margin, a first left margin, and a first right margin further comprising:
generating one or more margin pixels of any one of the first bottom margin and the first right margin using at least one pixel located within the fourth region of the digital image, wherein the fourth region is located at a bottom-right portion of the digital image.

15. The method of claim 9, wherein the generating one or more margin pixels for at least one of a first top margin, a first bottom margin, a first left margin, and a first right margin further comprising:
generating one or more margin pixels of any one of the first top margin and the first left margin using data information of at least one of (i) one or more pixels of a top edge of the first region of the digital image, (ii) one or more pixels of a left edge of the first region of the digital image, and (iii) one or more colors including black.

16. The method of claim 9, wherein the generating one or more margin pixels for at least one of a first top margin, a first bottom margin, a first left margin, and a first right margin further comprising:
generating one or more margin pixels of any one of the first bottom margin and the first right margin using data information of at least one of (i) one or more pixels of a top edge of the second region of the digital image, (ii) one or more pixels of a left edge of the third region of the digital image, (iii) one or more neighboring pixels of the first region of the digital image, (iv) one or more pixels of the first region of the digital image, and (v) one or more colors including black, wherein the second region is located at a bottom-left portion of the digital image, and the third region is located at a top-right portion of the digital image.

17. A method of displaying a digital image using an electronic display device, the method comprising:
apportioning pixels of the digital image into two or more regions, wherein each region of the two or more regions of the digital image corresponds to a display region of the electronic display device;
generating one or more margin pixels for at least one of a top margin, a bottom margin, a left margin, and a right margin for each region of the two or more regions of the digital image;
processing pixels of each region of the two or more regions of the digital image using the one or more margin pixels to produce processed pixels for each region of the two or more regions of the digital image; and
displaying the processed pixels of each region of the two or more regions of the digital image using a corresponding display region of the electronic display device.

18. The method of claim 17, the generating one or more margin pixels for a top margin, a bottom margin, a left margin, and a right margin for each region of the two or more regions of the digital image further comprising:

generating one or more margin pixels for any one of the top margin, the bottom margin, the left margin and the right margin of a first region of the two or more regions of the digital image using data information of at least one of (i) one or more pixels of the first region of the two or more regions of the digital image, (ii) one or more pixels of a neighboring region of the first region of the two or more regions of the digital image, and (iii) one or more colors including black.

19. The method of claim 17, wherein the electronic display device having a width and a height, in unit of pixels, and a display resolution corresponding to the width times the height, wherein the display resolution is greater than a resolution of the digital image.

20. The method of claim 17, wherein the digital image having a first width and a first height, and a processed digital image having a second width and a second height, in unit of pixels, the digital image having a first resolution corresponding to the first width times the first height, and the processed digital image having a second resolution corresponding to the second width times the second height, the processed digital image corresponds to the resultant displayed image using a display region of the electronic display device for each one of the two or more regions of the digital image, wherein the second resolution is larger than the first resolution.

* * * * *